United States Patent [19]
McCormack et al.

[11] Patent Number: 6,128,579
[45] Date of Patent: *Oct. 3, 2000

[54] AUTOMATED MATERIAL BALANCE SYSTEM FOR HYDROCARBON RESERVOIRS USING A GENETIC PROCEDURE

[75] Inventors: Michael D. McCormack, Plano; Donald J. MacAllister, Carrollton; Richard F. Stoisits, Plano, all of Tex.; Perry W. Scherer, Harrison, N.Y.; Tuan D. Ma, Anchorage, Ak.

[73] Assignee: Atlantic Richfield Corporation, Los Angeles, Calif.

[*] Notice: This patent is subject to a terminal disclaimer.

[21] Appl. No.: 09/140,121

[22] Filed: Aug. 25, 1998

Related U.S. Application Data

[63] Continuation-in-part of application No. 08/818,733, Mar. 14, 1997, Pat. No. 5,924,048.

[51] Int. Cl.$^7$ ..................................................... G01V 3/38
[52] U.S. Cl. ............................................................... 702/13
[58] Field of Search ................................. 702/6, 9, 12, 13

[56] References Cited

U.S. PATENT DOCUMENTS

| | | |
|---|---|---|
| 5,255,345 | 10/1993 | Shaefer . |
| 5,319,781 | 6/1994 | Syswerds . |
| 5,390,282 | 2/1995 | Koza et al. . |
| 5,541,848 | 7/1996 | McCormack et al. . |

OTHER PUBLICATIONS

Lawrence Davis, "Bit–Climbing, Representational Bias and Test Suite Design", Proceedings of the Fourth International Conference on Gentic Algorithms, University of California, San Diego, Jul. 13–16, 1991, p. 18–23.

Ken Lunn & Caroline Johnson, *Spatial Reasoning With Genetic Algorithms An application in Planning of safe Liquid Petroleum Gas Sites*, pp. 74–84.

IEEE Transactions on Geoscience and Remote Sensing., *An Improved Technique in Porosity Prediction: A Neural Network Approach*, vol. 33, No. 4, Jul. 1995, pp. 971–980.

L.S. Diniz et al., *Application of a Genetic Algorithm for Calibration and Structural Modification of Tank Model*, pp. 11–20.

AI Expert; *Genetic Algorithms for Schedule Optimization*, May 1992, pp. 23–27.

Prentice–Hall, Inc., *Applied Petroleum Reservoir Engineering*, Chapter 4, 1959, pp. 148–156.

McGraw–Hill Book Company, *Petroleum Reservoir Engineering Physical Properties*, Chapter 8, 1960, pp. 561–598.

*Primary Examiner*—Donald E. McElheny, Jr.
*Attorney, Agent, or Firm*—Haynes and Boone, LLP

[57] ABSTRACT

A system for producing a material balance solution for well patterns in a hydrocarbon reservoir is described that automatically optimizes the fluid allocation factors for each well used in determining the solution. The system automatically optimizes estimates for the allocation factors to be used in the material balance solution by randomly generating a first generation of allocation factor strings, each string in the generation assigning allocation factors to each of the wells in the reservoir. A fitness function value is determined for each of the strings by evaluating a fitness function, wherein the fitness function comprises the sum of the differences between computed and measured field pressures for each pattern, and the sum of the differences between target allocation factors and the allocation factors specified within the string for each well. A succeeding generation of allocation factor strings is produced according to a genetic algorithm. The process of determining a fitness function value for each of the strings is then repeated for the succeeding generation. The string having a fitness function value meeting a specified criteria is identified, wherein the identified string represents the optimized estimates of the allocation factors for the reservoir for use in determining the material balance solution.

26 Claims, 6 Drawing Sheets

AUTOMATED MATERIAL BALANCE SYSTEM FOR HYDROCARBON RESERVOIRS USING A GENETIC PROCEDURE

CROSS-REFERENCE TO RELATED APPLICATION

This application is a continuation-in-part of U.S. patent application Ser. No. 08/818,733, filed Mar. 14, 1997, issued Jul. 13, 1999 as U.S. Pat. No. 5,924,048, and assigned to the assignee of the present application.

BACKGROUND OF THE INVENTION

The invention relates generally to processing of numerical data which characterize subsurface earth formations. More particularly, the invention relates to a method and a system for optimizing the injection and production well fluid allocation factors used in a material balance analysis of a hydrocarbon reservoir.

In the commercial recovery of hydrocarbons it is desirable to estimate the fluid saturations and pressure changes that occur in the reservoir as a result of injecting fluids into the reservoir and producing fluids therefrom, and then compare these results with actual measurements to maximize the efficiency of recovery. A key constraint in determining accurate estimates is the conservation of total mass of injected and produced fluids, i.e., the "material balance."

As used in the art, the term "material balance" describes the process of determining the total fluid volumes entering and leaving a volume over a time period using this information to compute resulting reservoir pressures and fluid saturations. Material balance calculations are well known and described fully in *Petroleum Reservoir Engineering: Physical Properties*, J. W. Amyx, D. M. Bass, Jr., R. L. Whiting, McGraw-Hill Book Co., New York, 1960, pp. 561–598, and *Applied Petroleum Reservoir Engineering*, B. C. Craft and M. F. Hawkins, Prentice-Hall, Inc., Englewood Cliffs, N.J., 1959, pp 148–156 (hereinafter collectively referred to as "Material Balance References"). Generally, the reservoir is divided into a set of volumes called "patterns" centered on producing wells with injection wells on the pattern borders. A separate material balance calculation is performed for each pattern. Because injection wells are on pattern boundaries, fluid from a single injection well must be allocated to more than one pattern. Current practice is to estimate the allocation of fluids from each of the injection wells surrounding a producer by assigning allocation factors for each well, where the allocation factors represent the fraction of fluid injected to or produced from a well, into or out of a well pattern. For production wells, the production allocation factors describe the split of produced fluids among production zones vertically (e.g., two production zones would result in two unknown allocation factors for each production well). Injection well allocation factors describe the portion of injected fluid that migrates to each of the surrounding production wells for each production zone. For example, an injection well completed in two production zones and bordering on four patterns will result in eight unknown allocation factors.

Mathematical solution of the fluid allocation problem is complex because, for a typical reservoir, there can be hundreds to thousands of unknown allocation factors. Reservoir pressure response to injection and production is non-linear making the allocation factors difficult to estimate by traditional optimization techniques. When comparing estimates to actual data, changing a well allocation in one pattern to match field observations changes the well allocation factors in all surrounding patterns. Traditional practice is to manually iterate possible solutions for the allocation of fluids from each of the injection wells surrounding a producer until a "reasonable" pressure profile for all patterns in the reservoir is achieved. This is a labor intensive and subjective process. Efforts to automate this allocation process using a least-squares, linear programming approach have not been satisfactory.

By way of further background, optimization methods known as "genetic algorithms" have been applied to non-linear problems in many diverse areas, including operation of a gas pipeline, factory scheduling and semiconductor layout. Genetic algorithms serve to select a string (referred to as a "chromosome") of numbers ("genes") having values ("alleles") that provides the optimum value of a "fitness function." According to this technique, a group of chromosomes (a "generation") is first randomly generated, and the fitness function is evaluated for each chromosome. A probability function is then produced to assign a probability value to each of the chromosomes according to its fitness function value, so that a chromosome with a higher fitness function value obtains a higher probability. A "reproduction pool" of chromosomes is then produced by random selection according to the probability function; the members of this reproduction pool are more likely to be selected from the higher fitness function values. A randomly selected chromosome from the reproduction pool then "reproduces" with another, randomly selected, chromosome in the reproduction pool by exchange of genes at a randomly selected "crossover" point in the chromosome. This reproduction is repeated to generate a second generation of chromosomes. Mutation may be introduced by randomly altering a small fraction of the genes in the second generation (e.g., one in one thousand). The fitness function is then evaluated for each of the chromosomes in the second generation, and the reproduction process is repeated until the desired convergence is obtained.

Over the years, researchers have developed many different variants of the original Genetic Algorithm implementation. The algorithm described above is one implementation that was used to solve the material balance problem. A second variant of the Genetic Algorithm methodology, a "Bit Climber," was also applied. The Bit Climber provided a solution with accuracy equal to that achieved with the first Genetic Algorithm procedure and improved computer speed. Other variants of the Genetic Algorithm methodology can also be applied to this problem. Techniques for implementing the Bit Climber are well known to those skilled in the art and are described in Lawrence Davis, "Bit-Climbing, Representational Bias and Test Suite Design", Proceedings of the Fourth International Conference on Genetic Algorithms, University of California, San Diego, Jul. 13–16, 1991, p. 18–23, which is hereby incorporated by reference in its entirety.

What is needed, therefore, is a method of automating the material balance process as it relates to the estimate of fluid allocation factors for production and injection wells in the reservoir, using a stochastic optimization technique, such as a genetic algorithm procedure, that can more readily accommodate non-linear aspects of this problem.

SUMMARY OF THE INVENTION

The present invention, accordingly, provides a system and method of producing a material balance solution for well patterns in a hydrocarbon reservoir that automatically optimizes the fluid allocation factors for each well used in determining the solution. The system and method is applied to a hydrocarbon reservoir having injection and production wells in which well patterns are defined volumes centered around each production well with fluid contributions from injection wells at the pattern boundaries. The allocation factors represent the fraction of fluid injected to or produced from a well into or out of a well pattern.

In one embodiment, the system and method automatically optimizes estimates for the allocation factors to be used in the material balance solution by randomly generating a first generation of allocation factor strings, each string in the generation assigning allocation factors to each of the wells in the reservoir. A fitness function value is determined for each of the strings by evaluating a fitness function, wherein the fitness function comprises the sum of the differences between computed and measured field pressures for each pattern, and the sum of the differences between target allocation factors and the allocation factors specified within the string for each well. A succeeding generation of allocation factor strings is produced according to a genetic algorithm. The process of determining a fitness function value for each of the strings is then repeated for the succeeding generation. The string having fitness function value meeting a specified criteria is identified, wherein the identified string includes optimized estimates of the allocation factors for the reservoir for use in determining the material balance solution.

In another aspect, the identification of the fitness function value meeting the criteria further includes determining whether the criteria has been satisfied, whereupon the string identification occurs when the criteria has been satisfied; and further, responsive to determining that the predetermined criteria is not satisfied, repeating the steps of producing a succeeding generation of strings; and determining a fitness function value for each of the strings in the succeeding generation.

In another aspect of the invention, the process of producing a succeeding generation of allocation factor strings comprises creating a probability value for each of the allocation factor strings in first generation by determining the fractional contribution of each string in the generation to the sum of the fitness function values for the strings in the generation; selecting parent sequences from the first generation according to the probability values; randomly selecting pairs of parent strings; and crossing over the selected pairs of parent strings relative to one another at a randomly selected value position to produce the succeeding generation.

In a preferred embodiment the invention is implemented as computer program instructions stored on computer-readable media. The program can run on any PC or workstation.

A technical advantage achieved with the invention is accuracy in estimating allocation factors needed in developing a material balance solution heretofore not readily obtainable with traditional estimation techniques. A result of the foregoing is a material balance solution that enables hydrocarbons to be more efficiently swept from a reservoir.

Another technical advantage achieved is a substantial reduction in manpower and saving of time normally required to determine estimates of allocation factors for well production and injection in large reservoirs.

DESCRIPTION OF THE PREFERRED EMBODIMENTS

Figure 1:
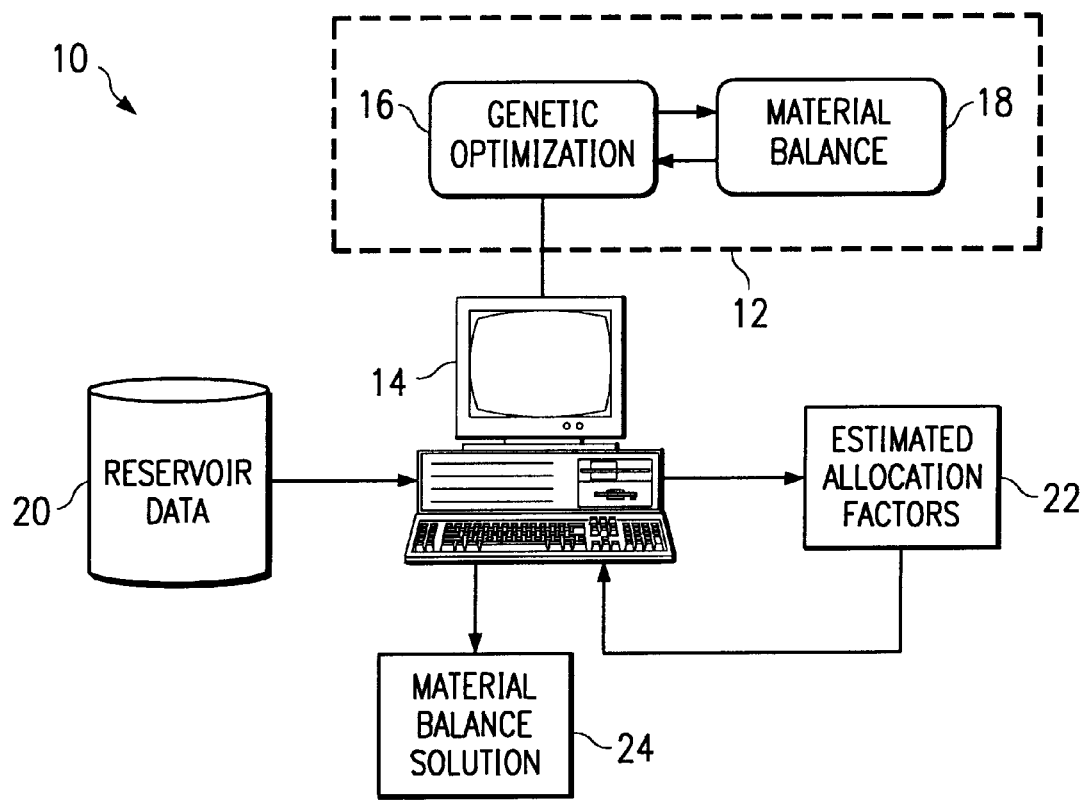
FIG. 1 is a schematic block diagram of an automated material balance system of the present invention.

In FIG. 1, the reference numeral 10 refers to an automated material balance analysis system of the present invention used for the analysis of hydrocarbon reservoirs. The system 10 includes a program 12 operatively coupled to a work station 14 for performing functions, described in detail below, relating to determining the material balance of fluids in a subsurface reservoir having injection and production wells (shown schematically in FIGS. 2 and 3), and functions particularly relating to the optimization of fluid allocation factors used in the material balance determinations. The work station 14 is a PC, or alternatively a UNIX workstation or the like.

As described in detail below, the work station 14 executes a genetic optimization process 16 and a material balance process 18, both of which are cooperating modules of the program 12, using reservoir data 20 as input thereto. The genetic optimization process 16 iteratively produces estimates 22 of fluid allocation factors for the wells, until an optimized set of allocation factors is obtained based upon an acceptance criteria. The optimized allocation factors are then used to provide a material balance solution 24 for the reservoir.

A material balance solution consists of a set of allocation factors for every producing and injection well in an area of interest. This set of allocation factors, when correctly determined and which entered into a material balance program, will produce a pressure value for each pattern that matches a measured pressure value to within a prespecified error limit.

Figure 2:
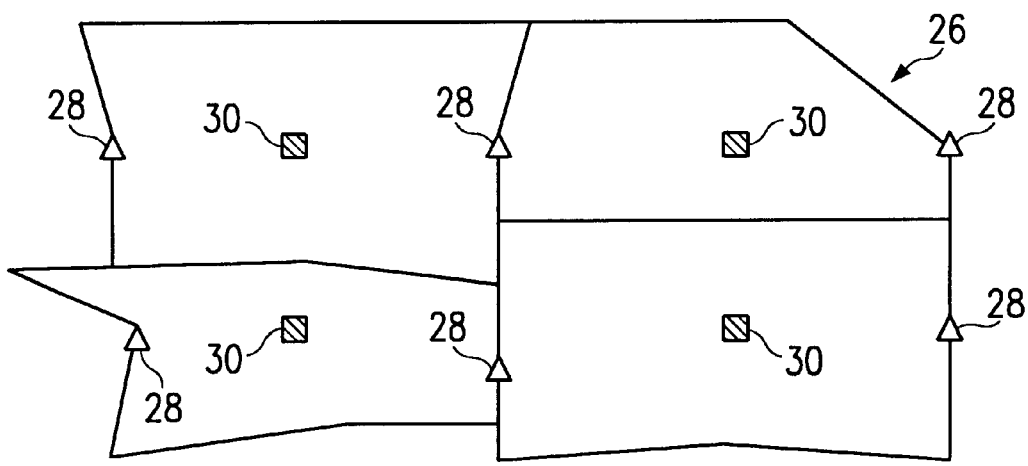
FIG. 2 is a schematic plan view of the reservoir environment from which reservoir descriptions are obtained for input to the system of FIG. 1.
Figure 3:
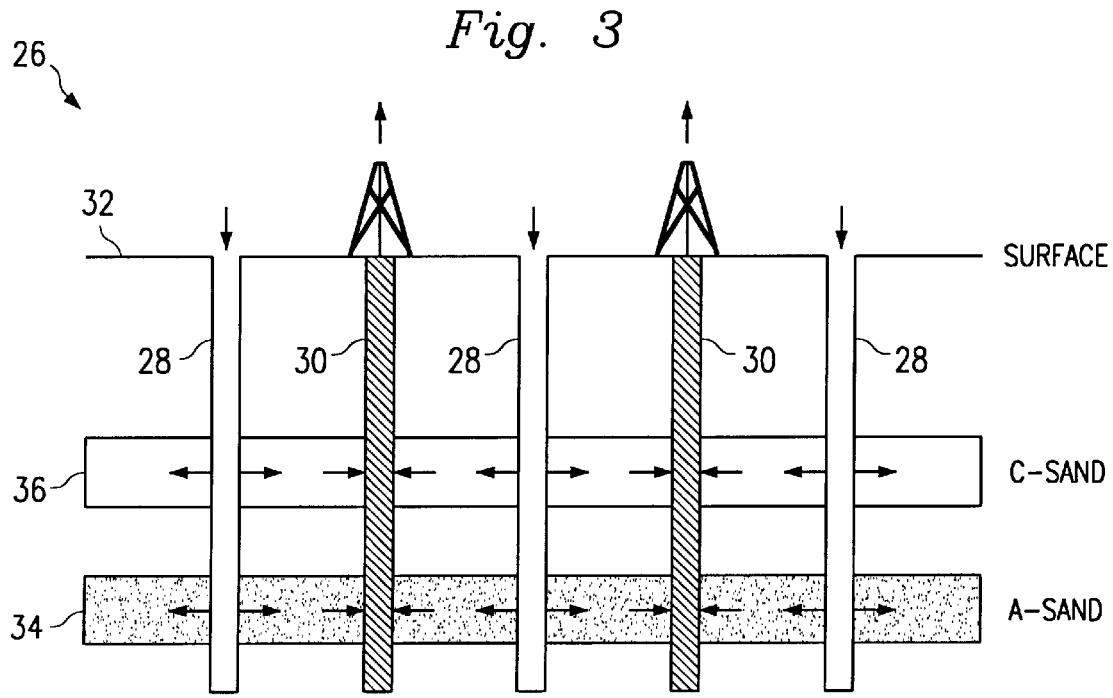
FIG. 3 is schematic cross-sectional view of the reservoir environment illustrating production and injection wells extending into sands from which the reservoir descriptions are obtained for input to the system of FIG. 1.

FIGS. 2 and 3 schematically illustrate the environment from which the reservoir data 20 is obtained for input to the system 10. FIG. 2 is a plan view, and FIG. 3 is an elevated sectional view, of a hydrocarbon reservoir 26. A plurality of injection wells 28 and production wells 30 extend from a surface 32 into the reservoir 26. A-Sand interval 34 and C-Sand interval 36 are representative non-communicating fluid injection/production intervals within the reservoir 26 as indicated by flow arrows associated with each of the wells 28, 30.

Within the reservoir 26 fluid (e.g., oil, water and gas) is produced from a number of the production wells 30 and fluid (e.g., water and gas) is injected into some configuration of injection wells 28.

The fluid allocation problem to which the system 10 is directed is that for each production well 30, it is necessary to determine how the total fluid production is divided between the A-Sand and C-Sand intervals 34, 36; and for each injection well 28, it is necessary to determine the portion of fluid injected that travels to each surrounding production well 30 in the two sands (i.e., intervals 34, 36). For example, if there are N production wells 30 in the reservoir 26 around a given injection well 28, then for the A-Sand interval 34 there will be N fractional allocations (i.e., allocation factors) that describe the fraction of the total fluid injected into that formation over a period of time that ultimately travels to one of the N production wells 30. There will also be M different allocation factors for the C-Sand interval 36. The sum of A-Sand and C-Sand allocations must be 1.0 (i.e., M+N=1.0). Note that if all wells are completed in both the A-Sand and C-Sand intervals 34, 36 then N=M.

For a typical earth formation (e.g., the Kuparuk field in Alaska), the reservoir 26 is sufficiently large that hundreds to thousands of allocation factors must be determined. Reservoir pressure response to injection and production (used in determining the allocation factors) is non-linear making the allocation factors difficult to estimate. When comparing estimates of allocation factors to actual data, changing a well allocation in one production well 28 pattern to match field observations changes the well allocation factors in all surrounding production well patterns.

The system 10 operates to automate the determination of well allocation factors using the genetic optimization process 16. First, an appropriate "chromosome" representation of the allocation factors for wells 28, 30 in the reservoir 26 must be created for use in applying the process 16. This is described below with reference to FIGS. 4 and 5.

Figure 4:
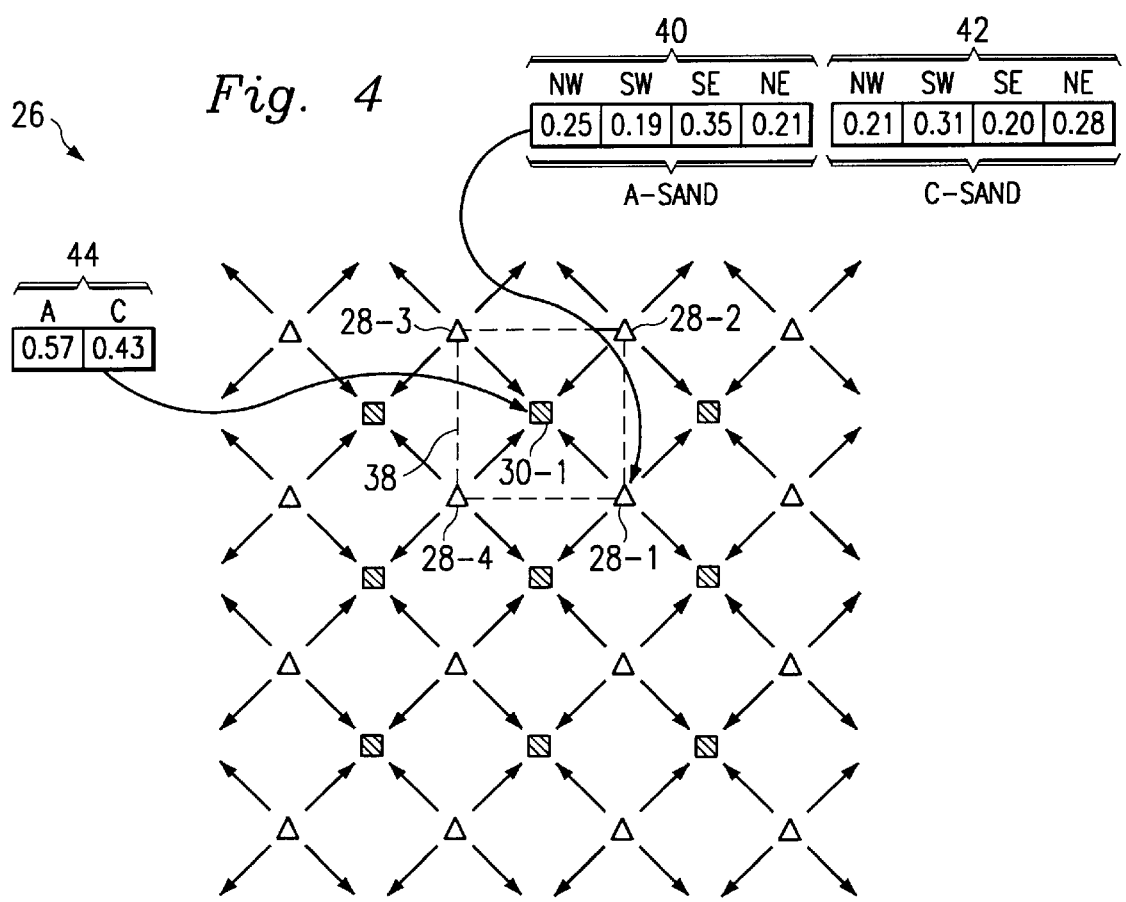
FIG. 4 is a schematic plan view of the reservoir environment illustrating fluid allocations from the injection and production wells used in defining allocation factor strings for use in the system of FIG. 1.

In FIG. 4, a "chromosome" representation of the allocations factors for wells 28, 30 in the reservoir 26 is explained with reference to a schematic plan view of the reservoir that shows fluid outflow (represented by arrows) from each injection well 28 into the formation. In this example, the FIG. 4 representation of the reservoir 26 is limited to a 3-by-3 array of production wells 30 and surrounding injection wells 28, it being understood that a much larger number of injection and production wells are contemplated in practice.

Production well 30-1 and surrounding injection wells 28-1, 28-2, 28-3 and 28-4 form a representative well "pattern" 38 within the reservoir 26, it being understood that nine such patterns exist (one for each production well 30) in the reservoir as shown in FIG. 4. The pattern 38 defines a volume of the reservoir 26 centered around the production well 30-1 with fluid contributions being shown (by arrows) from the injection wells 28-1, 28-2, 28-3, 28-4 at the pattern boundaries. In the diagram of FIG. 4, the injection well 28-1 shows that fluid being injected into the well 28-1 splits into four "streams" in the formation going to four different production wells 30. The four fluid streams are represented by the arrows extending from the injection well 28-1 in the northwest (NW), southwest (SW), southeast (SE), and northeast (NE) directions as shown in FIG. 4 (wherein a directional coordinate system is defined with north being at the top of the figure). For example, in the A-Sand interval 34, the fraction of fluid flowing from well 28-1 to the northwest could be 0.25, to the southwest 0.19, to the southeast 0.35, and to the northeast 0.21. Note that these four fractions must sum to 1.0. For injection well 28-1 a "chromosome" representation is created that consists of the four fractional allocations concatenated to form a string 40 (FIG. 4):

0.25 0.19 0.35 0.21

This chromosome representation can be expanded by further appending a similar four-value string 42 which represents the allocation factors for injection well 28-1 in the C-Sand interval 36:

0.25 0.19 0.35 0.21 0.21 0.31 0.20 0.28

The chromosome representation is further expanded by appending similar strings representing allocation factors for injection wells 28-2, 28-3, 28-4 and for the production well 30-1. Note that a two-value string 44 (the total of which is 1.0) represents the allocation factors for fluid received in the production well 30-1 in both the A-Sand and C-Sand intervals.

A chromosome representation for the entire reservoir 26 is constructed in the foregoing manner by appending together in one chromosome string the allocation factors for all injection wells 28 and all production wells 30 for all sand intervals that are to be considered in the optimization process 16. A typical chromosome representation for a three-by-three group of nine patterns 38 will consist of approximately 80 to 120 allocation factor values.

Floating point values are used for the fractional allocation factors in the chromosome representation although alternative values may be utilized. For example, binary bit encoding can be used wherein each fluid allocation is quantized into one of a set number (e.g., 16) discrete levels between 0 and 1, each represented by 4 binary digits. The use of floating point values is preferred, however, because binary bit values would result in a much larger number of chromosome values and, as can be appreciated, convergence time increases exponentially with the number of chromosome values.

Figure 5A:
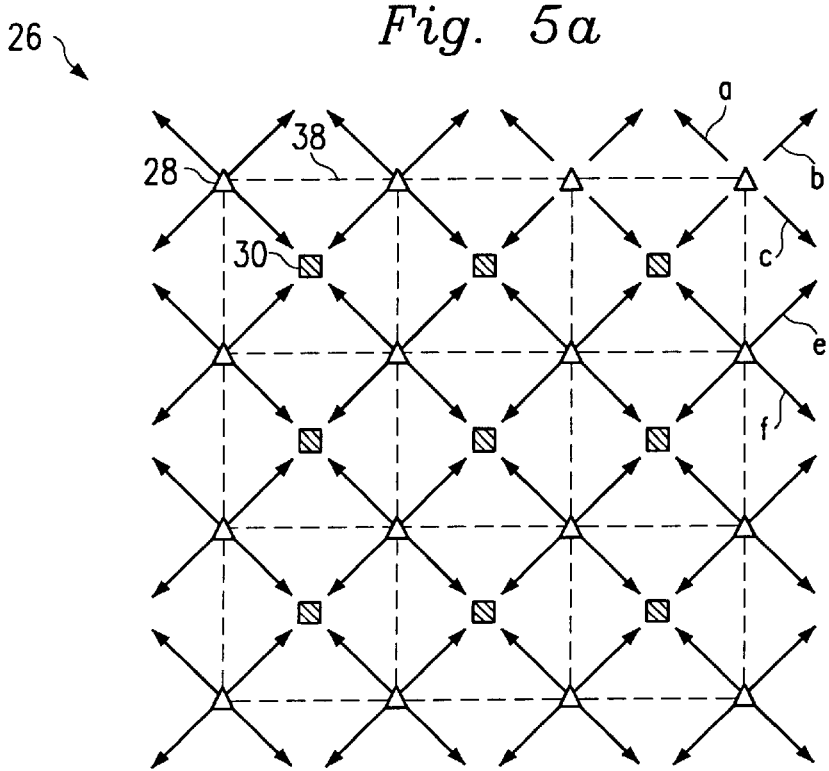
FIGS. 5a and 5b are schematic plan views of the reservoir environment illustrating fluid allocations at boundaries of the reservoir from the injection wells used in defining allocation factor strings for use in the system of FIG. 1.
Figure 5B:
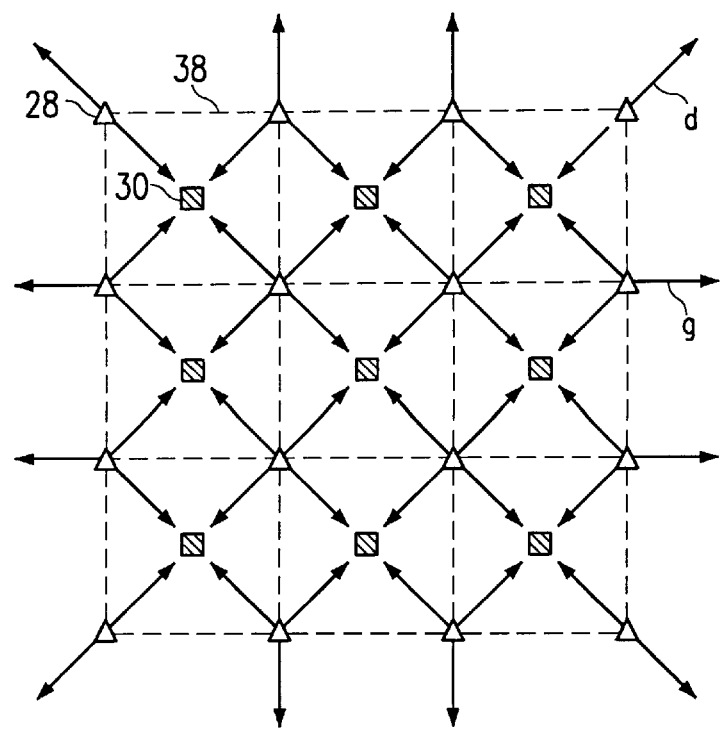

FIGS. 5a and 5b illustrate a preferred manner of how to represent the allocation factors for the reservoir 26 at the edges of the hydrocarbon field (i.e., at the edges of the reservoir) or at the edges of a group of patterns that are currently being optimized if a subset of the reservoir is being considered. In FIG. 5a, an idealized set of nine patterns 38 are shown, each corresponding to one of the nine production wells 30 in the illustration of the reservoir 26. The illustration of the reservoir 26 in FIGS. 5a and 5b may represent the entire reservoir or an area of interest for purposes of optimizing selected allocation factors.

The allocations for fluid streams (represented by arrows) at the edge of the reservoir 26 represent fluid outflow or loss to patterns 38 under consideration. Therefore, appropriate boundary conditions for these edge allocations are determined so that this fluid outflow will not unduly influence the accuracy of computed allocations for interior ones of the wells 30. As shown in FIGS. 5a and 5b, the flow streams in the patterns 38 at the edges are replaced by simplified equivalents. At the patterns 38 in the corners, allocation factors represented by flow streams a, b, c are replaced with an allocation factor represented by flow stream d, thus coalescing 3 allocation factors into one. At the pattern edges that are not at the corners, allocation factors represented by flow streams e, f are replaced with an allocation factor g, thus collapsing two allocation factors into one. This procedure reduces the number of variables in the search space and will enhance the performance of the genetic optimization process 16 without loss of accuracy in the interior well allocations.

Figure 6:
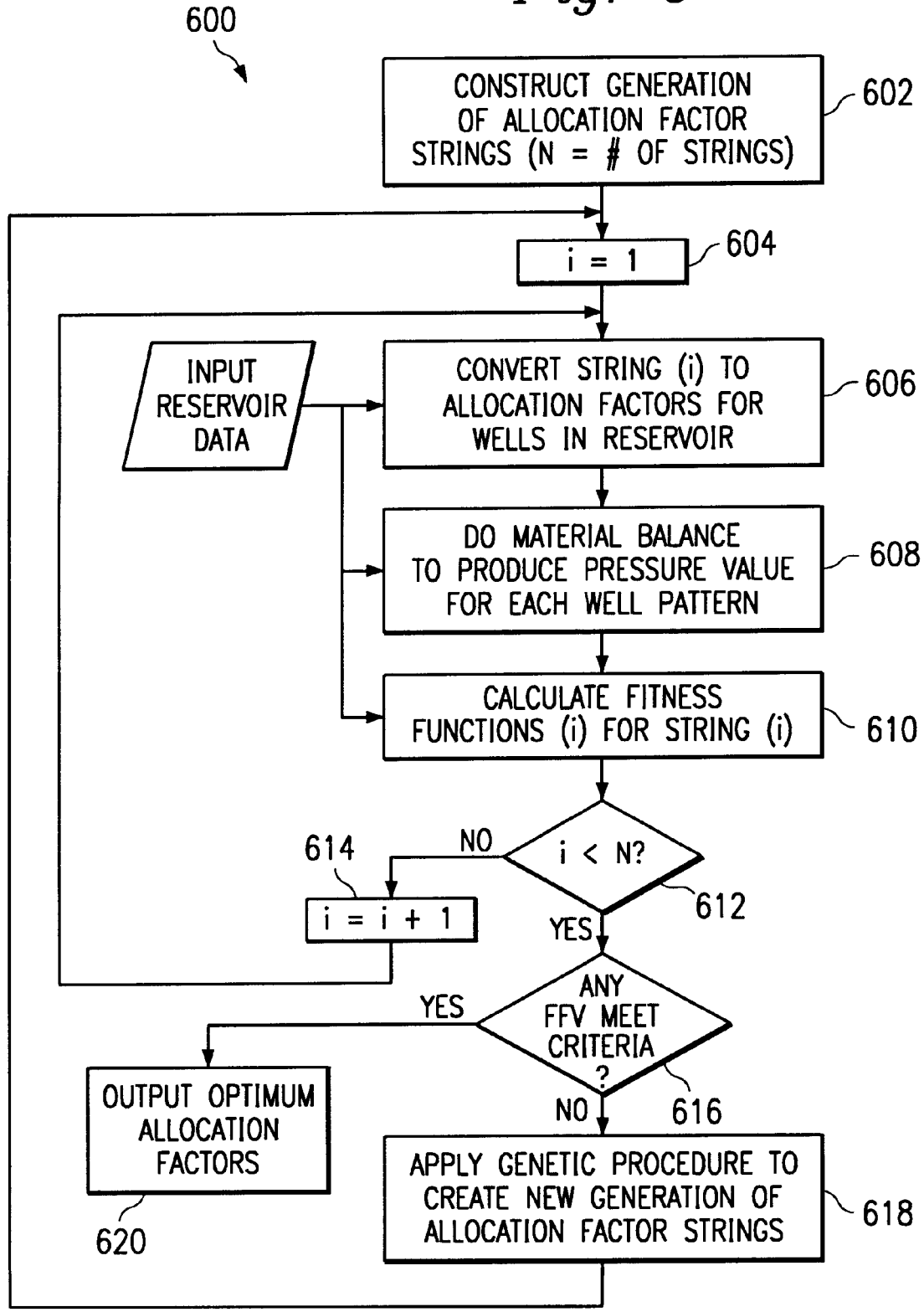
FIG. 6 is a process control flow diagram of the system of FIG. 1.

FIG. 6 is a process control flow diagram 600 illustrating operation of the system 10. The diagram 600 illustrates operation of the system 10 to optimize the values of fluid allocation factors needed in determining material balance for wells 28, 30 in the reservoir 26.

Referring also to FIG. 1, components are shown for the process control of the system 10 as presented in FIG. 6. While not shown, it is understood that operation of the system 10 is implemented by user commands and programming instructions executed on the computer 14. The genetic optimization process 16 and the material balance process 18 are executed, in one embodiment, by respective software programs running on the computer 14 under the direction of an appropriate computer operating system (not shown).

In FIG. 1, the reservoir data 20 is a database that contains information about the reservoir of interest for the system 10. The data 20 includes (1) initial conditions for each production well pattern 38 in the reservoir 26 including, but not necessarily limited to, hydrocarbon pore volumes, reservoir depths and initial water saturation; (2) a record of production and injection volumes for every well as a function of time; and (3) a description of the well patterns in the reservoir 26 and relationships between the wells with respect to fluid flow used for developing the chromosome representation of the reservoir. The material balance process 18 computes the pressure (P) within a production well pattern based upon the initial reservoir 26 conditions and subsequent historical fluid production and injection volumes. The process 18 uses fluid volume information from the reservoir data 20 and uses estimated allocation factors 22 developed by the system 10 using the genetic optimization process 16, to derive a pressure profile for each well pattern 38 being evaluated. The genetic optimization process 16 is a stochastic optimization process that provides estimates 22 of the allocation factors for each well, by iteratively interacting with the material balance process 18 as described in detail below.

Referring now to FIG. 6, explained herein are steps of the diagram 600 carried out by the system 10 to optimize the values of fluid allocation factors for wells 28, 30 in a region of interest of the reservoir 26. In step 602 a generation of allocation factor strings is constructed for the wells 28, 30 that define the region of interest of the reservoir 26. Each allocation factor string is a chromosome representation of the region that includes all of the allocation factors for all the injection wells 28 and production wells 30 to be considered in the optimization. Depending upon the size of the reservoir 26, the string may be hundreds to thousands of values in length. The values included in the string are chosen at random and do not need to represent actual data. The values in the string further do not need to comply with the rules of construction for creation of the chromosome representation of each well, i.e., wherein the total of the values is equal to 1.0. Once the string for the reservoir 26 is created, step 602 calls for the construction of an entire generation of strings. The number of strings to be included in the generation is chosen based upon some predetermined criteria.

In one embodiment, the number of strings in a generation is equal to, or roughly equal to (plus or minus twenty percent), the number of values in the string. For example, if the string has 100 allocation values then the generation would be about 100 strings in number. In step 602, the number of strings in the generation to be constructed is represented as N.

In steps 604–612 a fitness function is applied to each string of allocation factors such that each string in the generation is given a fitness function value. Thereafter in steps 616 and following, a genetic optimization process is iteratively applied to the strings until a string is identified that has a fitness function value meeting an acceptance criteria. A string meeting the acceptance criteria defines optimum allocation factors for the reservoir 26 which are output in step 620.

More specifically, in step 604 a counter (i) is set (to a value of 1) that represents the string upon which subsequent steps are then performed. In step 606 the allocation factor values in the string (i) are converted to allocation factors for the wells 28, 30. The conversion comprises a normalization process. The allocation factor values in the string, having been randomly generated, are not yet normalized according to the requirements of the chromosome representation (discussed previously with reference to FIGS. 4 and 5) in which the allocation factors for each injection well must total 1.0 and in which the allocation factors for each production well must total 1.0 for all production intervals in which the well is completed. Therefore, for each well 28, 30, the allocation factors from the string are identified that are associated with each well and then they are normalized so that the sum of the allocation factors for each well are equal to 1.0. Normalized allocation factors are produced in this manner for the entire string (i). Data needed for performing the normalization process are accessed by the system 10, as indicated in step 607, from the reservoir data 20. The reservoir data 20 includes descriptions of the relationships between patterns 38 and wells 28, 30 that define the chromosome representation for the reservoir 26, as discussed above.

In step 608 material balance calculations are performed on the string of normalized allocation factors to produce a pressure value for each well pattern 38. Input of reservoir data 20 (step 607) is used to perform the calculations. More specifically, for each well pattern 38, the net mass of fluid added to, or removed from, the pattern is determined using the normalized allocation factors from step 606 and the injection/production history data from the reservoir data 20. The pressure for each pattern is then calculated using the foregoing and additionally using as input, for example, initial pressure, initial fluid saturation, and production and injection history as a function of time over a specified time interval. Details of how to perform the material balance calculations are well known and described in Material Balance References cited above and previously incorporated by reference.

In step 610 a fitness function is performed for the string (i) to determine a fitness function value ($FFV_i$). The fitness function is used to evaluate the output of the material balance step 18 and to determine how good the estimates 22 of allocation factors are that have been generated by the genetic optimization process 16. The output ($FFV_i$) of the fitness function calculation for a given allocation factor string (i) (i.e., "chromosome") is a measure of how fit the string solution is for the current environment, and how likely it is that the solution will survive and propagate its genetic content into the next generation of solutions (subsequently described with reference to step 618).

The fitness function for string (i) is a linear combination of $F_0$ and $F_1$ as indicated by equation (1):

$$F(i) = aF_0 + bF_1 \qquad (1)$$

where $F_0$ is a pressure term, $F_1$ is an allocation factor term and the constants a and b are user-selected weights indicating the relative importance of the pressure and allocation terms in the fitness function. In experiments described subsequently below, the values used for these constants are a=5.0 and b=0.5.

The pressure term ($F_0$) of the fitness function computes the sum of the squared differences in pressure between two adjacent time steps. Thus as shown in equation (2):

$$F_o = \sum_{\text{All Patterns}} \{[P_{xy}(t) - P_{xy}(t-1)]/P_{xy}(t-1)\}^2 \quad (2)$$

where $P_{xy}(t)$ is the pressure in the pattern centered at coordinates (x, y) at time step t, and the summation is taken over all patterns in the current analysis of the reservoir 26.

Tests on a set of synthetic data using only the pressure term $F_0$ of the fitness function consistently failed to converge to accurate allocation factors. The problem with the pressure term $F_0$ alone as a solution of the fitness function was revealed through an analysis of the number of unknown allocation factors versus the number of equations relating allocation factors to production and injection. The analysis indicated that the system is under-determined because there are far more unknowns than equations available. The answer to this problem is to add the second term, the allocation factor term $F_1$, to the fitness function, where $F_1$ is represented by equation (3):

$$F_1 = \sum_{\text{All Wells}} \{[A_{uvxy}(t) - A_{uvxy}(t-1)]/A_{uvxy}(t-1)\}^2 \quad (3)$$

where $A_{uvxy}(t)$ is the allocation factor for the well at coordinates (u, v) in the pattern centered at coordinates (x, y) at time step t, and the summation is taken over all production and injection wells 28, 30 in the current computation. The $F_1$ constraint attempts to minimize the change in the allocation factors from one time interval to the next. The allocation factor for time 0, $A_{uvxy}(0)$, (the startup of the field) is computed using the hydrocarbon pore volumes of the patterns surrounding the well at (u, v). For the case of four patterns surrounding the well at (u, v) the allocation factor is represented by equation (4):

$$A_{uvxy}(0) = H_{xy}/(H_{xy} + H_{x-1,y} + H_{x-1,y-1} + H_{xy-1}) \quad (4)$$

where $H_{xy}$ is the hydrocarbon pore volume of the pattern centered at (x, y).

In experiments it was determined that including the outgoing fluid flux allocations of the chromosome representation (i.e., those corresponding to the fluid stream arrows along the border of the reservoir 26 in FIG. 5b) results in the genetic optimization process 16 driving these allocations to zero since the fitness function F minimizes pressure changes. To prevent this effect, outgoing allocations (i.e., those at the border of the reservoir 26 or the computation region of interest) are fixed to a constant value of N/M, where N is the total hydrocarbon pore volume of the patterns 38 bordering the region of interest and M is the total hydrocarbon pore volume of the patterns inside the region of interest as well as on the border.

The fitness function F of equation (1) was selected because of the scarcity and inaccuracy of actual field pressure measurements. It is expected that minimizing pressure and allocation factor changes with time will reflect the reservoir's natural tendency to equalize pressure areally as well as the operator's attempts to equalize the pressure distribution.

Additional constraint terms can be easily added to the fitness function F as they are identified and specified by the operators. These include, for example, a priori knowledge derived from other sources, such as direct measurements in a production well of the production of fluids from different formations of the field, or direct measurements of the volumes and directions of flow of injected fluids in a well. In these instances, the allocation factors of the subject wells are known and any viable genetic algorithm solution must reproduce these allocation factors. If a well has been shut in during the time period under consideration with no fluids injected or produced, then the well's allocation factors would all be 0.0, and this information could be used as a constraint. Surface production and injection facility throughput limitations can be used as constraints on permissible allocation factor values or ranges of values.

Referring now to step 612 of FIG. 6, once the fitness function is determined for the string (i), yielding a fitness function value FFV(i), it is determined if the string (i) is the last string (N) in the generation and if so, execution proceeds to step 616. If string (i) is not the last in the generation, in step 614 the value of (i) is incremented and steps 606–612 are repeated for the next string (i+1) to determine its fitness function, and so on, until the fitness functions are determined for all the strings (1 through N) in the generation.

In step 616 a determination is made whether any of the FFV's meet a specified convergence criteria. If not, then in step 618 a genetic procedure is applied to the strings of allocation factors thus constructing a new generation of strings upon which to apply the steps 604–616. As described below, the genetic procedure after many iterations through steps 604–616 eventually produces a string with a FFV meeting the acceptance criteria, thereby producing an output of optimum allocation factors in step 620. In one embodiment, the acceptance criteria for the FFV's is one that will yield pressure values of approximately within plus or minus 50–100 pounds. This magnitude of acceptance criteria is a major improvement over manual material balance procedures which can be several hundred pounds or more in error.

If in step 616 the acceptance criteria is not met, then in step 618 the genetic procedure is applied to create a new generation of allocation factor strings for evaluation.

Figure 7:
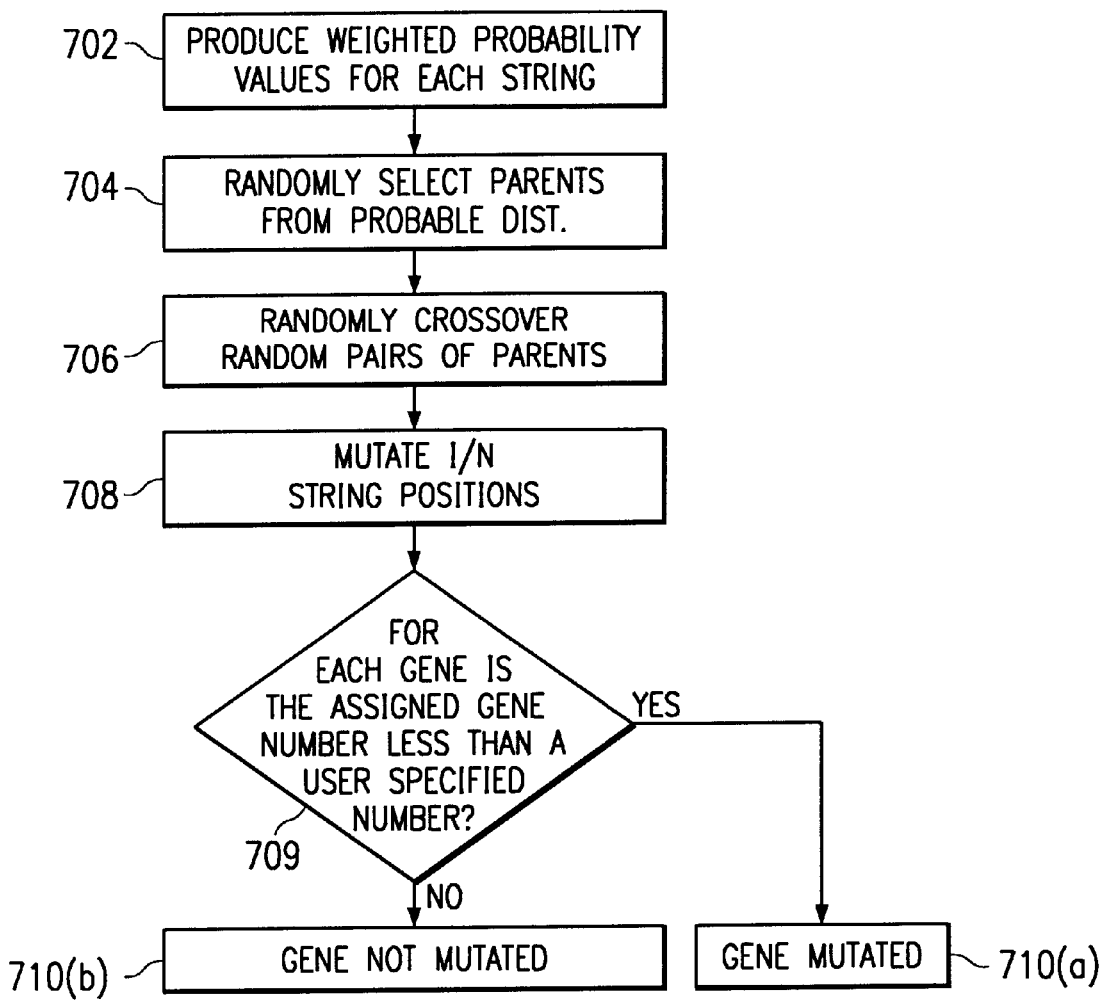
FIG. 7 is a process flow diagram of the genetic procedure used in the system of FIG. 1.

FIG. 7 is a flow chart illustrating details of the step 618 genetic procedure. According to genetic algorithm techniques as illustrated with reference to steps 702–708, the new generation of allocation factor strings (or "chromosomes") are randomly selected from the prior generation according to a probability function that affords greater likelihood of selection to sequences having higher (that is, better) fitness function values FFV. Conversely, the likelihood of selecting a low fitness function value string (that is, worse) is to be relatively low. According to the preferred embodiment of the invention, in step 702 the probabilities of selection are determined using a "rigged roulette wheel" technique in which the chances of selecting a string are weighted to be greater if the FFV for that string is higher, i.e., better as compared with that of other strings.

By way of example, if the following arrangement of strings (the number of allocation factors included in the strings being abbreviated and fitness function values were the four highest ranked strings in a generation:

0.13 0.88 0.10 0.21 0.43: FFV=3.45
0.39 0.72 0.15 0.01 0.41: FFV=2.80
0.47 0.19 0.76 0.72 0.11: FFV=2.21
0.46 0.32 0.66 0.10 0.19: FFV=1.70 and if a global sum of valid FFV's for the strings is 12.54, the probabilities determined for these strings would be as follows:

0.13 0.88 0.10 0.21 0.43: probability=0.275
0.39 0.72 0.15 0.01 0.41: probability=0.223

0.47 0.19 0.76 0.72 0.11: probability=0.176

0.46 0.32 0.66 0.10 0.19: probability=0.136

In this case, the cumulative probability for the remaining strings would be approximately 0.190.

In step 704, following assignment of the probabilities as shown above, reproduction candidate strings, or "parents", for the next generation of strings to be produced are selected. The number of parents selected equals the number of strings originally constructed in the first generation, but the parent strings are selected from the set of valid sequences for which probabilities are calculated, preferably in a random manner but according to the probabilities calculated, as shown in the above example. This ensures that strings with higher fitness function values FFV are thus more likely to become parents for the succeeding generation; as such, the genetic algorithm models the theory of natural selection.

In step 706, after selection of the parent strings in step 704, a reproduction process is performed to produce the next generation of strings, by randomly selecting pairs of parent strings and performing a "crossover" operation at a randomly selected position within the strings, thus creating new strings for evaluation. A rudimentary crossover operation on a pair of strings will now be explained by way of example. Consider the example where the following two strings were selected in step 704 as one pair of parents of the next generation (from the population of parents determined by step 702):

0.10 0.39 0.44 0.21 0.84

0.47 0.19 0.12 0.72 0.41

Step 706 would produce two "offspring" strings for the next generation by randomly selecting a crossover point, and by then swapping the numbers on one side of the crossover point with those numbers from the other parent string. Using the above example, if the crossover point were at the position between the second and third digits, crossover would occur as follows:

| Before crossover | After crossover |
| --- | --- |
| 0.10 0.39:0.44 0.21 0.84 | 0.10 0.39:0.12 0.72 0.41 |
| 0.47 0.19:0.12 0.72 0.41 | 0.47 0.19:0.44 0.21 0.84 |

Other types of crossover techniques known in the art may alternatively be used, some of which are described in Goldberg, *Generic Algorithms in Search, Optimization and Machine Learning* (Addison-Wesley, 1989), pp. 170 et seq.

Referring now to steps 708–710(*b*), it is known in the genetic algorithm field that "mutations" are useful to avoid trapping of the optimization at a local maximum, as such mutations encourage diversity in the offspring. Accordingly, in this embodiment of the invention, a mutation is performed upon the strings of step 706, by changing, to a different value, randomly selected ones of the numbers as determined by a random number generator by adding a randomly generated number to the selected number. In particular, in step 708, a random number is assigned to every gene in every chromosome. In step 709, for each gene, a determination is made whether the assigned gene number is less than a user-specified number. If so, execution proceeds to step 710(*a*), in which the gene is mutated to a random number between 0 and 1. Otherwise, execution proceeds to step 710(*b*) and the gene is not mutated.

Following the completion of step 710(*a*) or (*b*), a new generation of new strings has been produced and is ready for evaluation via the processes of FIG. 6, described above. The evaluation of the fitness function values FFV for this new generation is then performed, and the process continued until decision 616 determines that convergence to an optimal string has occurred. Output step 620 then presents an indication on the computer 14 to advise the human operator of the optimal assignment of allocation factors for the reservoir 14. Output step 620 may also be performed to produce a printed hard copy report of the optimized allocation factors or the material balance solution of process 24.

It is understood that the process of the system 10 may be repeated for a new reservoir 26 or region of interest therein. In addition, the operator may interactively and repetitively perform the optimization process with different values for the weighting factors, as discussed above, for example to determine the sensitivity of the optimization to one or more of the factors.

As discussed previously, there are many variants of the basic Genetic Algorithm procedure that have been developed by researchers over the years. One such variant is the "Bit Climber." The Bit Climber employs the same genetic structure for the unknown parameters as described previously; however, only one gene is created. Initially, the values for each parameter in this gene are assigned random values. Each parameter value is represented as a binary string of a given length, e.g., 10 bits. Associated with each bit in the parameter value is a "bit change" probability function. The bit change probability function is a number between 0 and 1 and describes the probability that a bit, if selected, will be permitted to change. Typically, within the 10 bits used to describe a single parameter value, the high order bits are assigned a lower probability value than the low order bits. This has the effect of preferentially allowing the low order bits to change.

In operating the Bit Climber, one bit location somewhere in the gene is randomly selected, and its value is flipped (i.e., if the selected bit is a 0, then it is changed to a 1 and vice versa) If a randomly generated number between 0 and 1 is less than a preassigned bit change probability value for the selected bit. The modified gene is then evaluated using the same fitness functions previously described. If the fitness function evaluation indicates that the modified gene is superior to the original gene, then the new state of the changed bit is retained. If the fitness function evaluation indicates that the modified gene is poorer than the original gene, then the changed bit is returned to its original value. If a selected bit is flipped, then its bit change probability function is modified to a lower value so that if this same bit location is randomly selected again, it is less likely that the bit will be flipped. After a large number of iterations of the above-described operations, the Bit Climber may become trapped in a local minimum that prevents it from attaining improved solutions. In this case the program will restore the bit change probability functions for each parameter value to the initial starting conditions so that bits can more easily be modified.

Furthermore, if, after a large number of iterations of the procedure described in the previous paragraph, the Bit Climber has not reached a satisfactory solution, the bit change probability functions for all parameter value will be modified, so that the bit change probability function value for every bit in the gene is equal to 1. This insures that any selected bit in the gene will be flipped in subsequent iterations.

If differences in reservoir pressure exist at different locations within a communicating formation, fluids will flow from regions of high pressure to regions of low pressure in a manner that is easily calculated using an equation commonly known as D'Arcy's Law. A volume of such fluid that moves from one pattern to an adjacent pattern is referred to as a "flux correction". One approach to implementing a flux correction is hereinafter described in detail.

Considering two adjacent patterns with a region of mutual contact of area A wherein the distance between the respective production wells thereof is L, using a first approximation of the allocation factors derived from the genetic optimization program 16, the material balance calculation reports respective pressure values for each of the patterns of $P_1$ and $P_2$. Using D'Arcy's Law, a fluid velocity flow V across the interface can be computed using the equation:

$$V=K(P_2-P_1)/L \qquad (5)$$

where K is the hydraulic conductivity expressed as:

$$K=\rho g k/\mu \qquad (6)$$

where $\rho$ is the fluid density, k is the intrinsic permeability, $\mu$ is the fluid viscosity, and g is the gravitational constant.

Fluid movement Q across the mutual interface A can be expressed as follows:

$$Q=VA=\rho g k(P_2-P_1)/L\mu \qquad (7)$$

The computation procedure for including a flux correction as described above is as follows. First, values for the fluid viscosity $\mu$ and fluid density $\rho$ are retrieved from the reservoir data 20. Next, the mutual interface area A for every adjacent set of patterns is computed. If the formation thickness is available, then this calculation is simple. If not, the following information, all of which is available from the reservoir data 20, will be needed to compute the thickness of the formation: (i) the hydrocarbon pore volume will be need for each sand in every pattern, (ii) the areal size of the pattern, (iii) the average porosity of the mutual interface, and (iv) the horizontal length of the mutual interface. Next, the mutual interface area A may have to be reduced by a "baffle factor," which describes the effective reduction in area due to physical phenomena such as fracturing or faults.

At this point, the distance L between the production wells for each set of adjacent patterns is computed and the average permeability for each pattern is obtained from the reservoir data 20. Next, the material balance program 18 is executed as previously described to generate pattern pressures over a given time interval. Fluid movement Q is then computed and integrated over the same time interval. This is the total fluid that has transferred between the two patterns. This volume must be stored for subsequent time steps. Finally, pattern pressures are recomputed, taking into account volumes of fluid that have migrated between the patterns during the time interval.

EXAMPLE

Figures 8, 9:
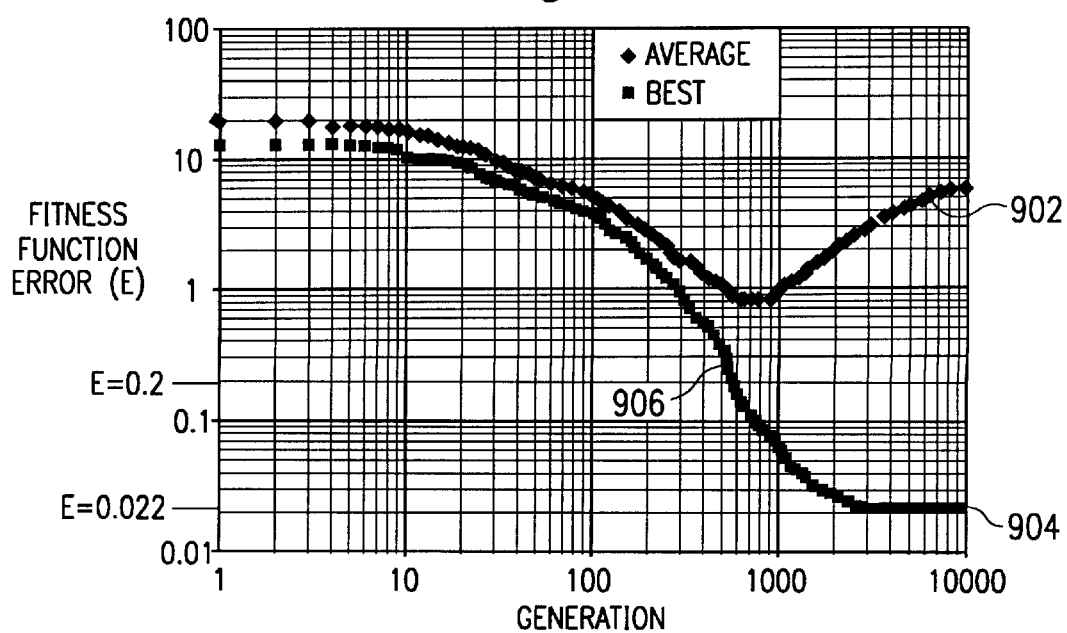
FIG. 8 is a schematic plan view of a reservoir description applied as an example in the use of the system of FIG. 1.
FIG. 9 is a graph illustrating fitness function error plotted with respect to generation for the system of FIG. 1 using the reservoir description of FIG. 8.

Referring to FIGS. 8 and 9, model data sets where the correct or optimum allocation factors are known were created to evaluate the performance and accuracy of the system 10 in determining a material balance solution.

In this example, FIG. 8 is a schematic representation of the reservoir field model used in the evaluation of the performance of the system 10 for the automated material balance. The shaded region is the area for which allocation factors are to be optimized. Each square represents one pattern with a production well at the center and four injection wells, one at each corner of the square. All wells that begin with the designation 2X or 2V are production wells; all wells with the 2C designation are injection wells. Patterns are named after the production well in their centers. In addition, there are two noncommunicating producing sands called the "A" and "C" sands.

In the Appendix below, production and injection data for the above area is captured in an ASCII text file stored in the computer 14 that mimics the format that we expect the actual production data to be in. The example shown contains production and injection data for year 1983 only. For each year the five data entries are, from left to right, Produced Oil, Produced Water, Produced Gas, Injected Water and Injected Gas.

Referring again to FIG. 8, a regular 3-by-3 set of patterns (the shaded squares 2V-10 through 2V-18) was selected as the region of interest for performing the optimization of allocation factors (FIG. 6). Hydrocarbon pore volumes and water saturations for A and C sands were assigned to each pattern, together with oil, water and gas production and injection volumes for each well in the model. A material balance process 18 was employed to compute resulting pressures in each pattern and each producing sand. Interactive adjustments were made to the production and injection rates to minimize pressure differences between adjacent patterns in each producing sand. When a satisfactory set of parameters was determined, the data was then utilized in the genetic optimization process 16 to estimate the allocation factors for each producer and injector. Eight allocation factors are computed for each injection well; four each for the "A" and "C" sands. Two allocation factors are determined for each producer representing the split of total fluid volumes produced from the "A" and "C" sands. To make the model as realistic as possible, actual data from the Kuparuk field in Alaska were used as the basis for each of the model parameters. The Appendix provides details of the model and parameter values.

Several experiments were conducted using the synthetic data described above and in the Appendix to study the performance, computation times and accuracy of the system 10 for automated material balance. Key results are summarized as follows.

Since the true allocation factors for the synthetic model can be easily determined, it is possible to compare the accuracy of the estimates of the allocation factors with the true factors. The results for the model shown in the Appendix are tabulated in Table I below. For each pattern the five numbers represent the allocation factors for the upper left injector, the lower left injector, the producer, the upper right injector and the lower right injector, respectively.

TABLE I

| True Allocation Factors: | |
|---|---|
| "A" Sand- | |
| Pattern 2V-10: | 0.151 0.158 0.571 0.142 0.130 |
| Pattern 2V-11: | 0.119 0.138 0.571 0.098 0.128 |
| Pattern 2V-12: | 0.092 0.087 0.571 0.085 0.095 |
| Pattern 2V-13: | 0.177 0.163 0.606 0.169 0.135 |
| Pattern 2V-14: | 0.195 0.255 0.585 0.162 0.190 |
| Pattern 2V-15: | 0.106 0.119 0.556 0.079 0.104 |
| Pattern 2V-16: | 0.153 0.122 0.545 0.162 0.143 |
| Pattern 2V-17: | 0.149 0.175 0.537 0.175 0.185 |
| Pattern 2V-18: | 0.111 0.146 0.538 0.118 0.135 |
| "C" Sand- | |
| Pattern 2V-10: | 0.113 0.119 0.429 0.106 0.098 |
| Pattern 2V-11: | 0.089 0.103 0.429 0.073 0.096 |
| Pattern 2V-12: | 0.069 0.065 0.429 0.064 0.071 |

TABLE I-continued

| | |
|---|---|
| Pattern 2V-13: | 0.115 0.106 0.394 0.110 0.088 |
| Pattern 2V-14: | 0.138 0.181 0.415 0.115 0.135 |
| Pattern 2V-15: | 0.085 0.095 0.444 0.063 0.083 |
| Pattern 2V-16: | 0.127 0.101 0.455 0.135 0.119 |
| Pattern 2V-17: | 0.128 0.151 0.463 0.151 0.160 |
| Pattern 2V-18: | 0.095 0.125 0.462 0.101 0.115 |
| Estimated Allocation Factors: | |
| "A" Sand- | |
| Pattern 2V-10: | 0.150 0.158 0.576 0.139 0.129 |
| Pattern 2V-11: | 0.119 0.138 0.571 0.101 0.128 |
| Pattern 2V-12: | 0.094 0.087 0.564 0.083 0.096 |
| Pattern 2V-13: | 0.178 0.160 0.606 0.170 0.137 |
| Pattern 2V-14: | 0.195 0.242 0.585 0.164 0.181 |
| Pattern 2V-15: | 0.104 0.120 0.564 0.078 0.107 |
| Pattern 2V-16: | 0.153 0.120 0.552 0.163 0.144 |
| Pattern 2V-17: | 0.147 0.174 0.531 0.174 0.186 |
| Pattern 2V-18: | 0.114 0.145 0.519 0.113 0.132 |
| "C" Sand- | |
| Pattern 2V-10: | 0.114 0.115 0.424 0.112 0.097 |
| Pattern 2V-11: | 0.094 0.103 0.429 0.072 0.100 |
| Pattern 2V-12: | 0.067 0.066 0.436 0.069 0.071 |
| Pattern 2V-13: | 0.111 0.107 0.394 0.110 0.089 |
| Pattern 2V-14: | 0.138 0.188 0.415 0.114 0.140 |
| Pattern 2V-15: | 0.087 0.094 0.436 0.064 0.080 |
| Pattern 2V-16: | 0.127 0.100 0.448 0.134 0.121 |
| Pattern 2V-17: | 0.129 0.153 0.469 0.149 0.159 |
| Pattern 2V-18: | 0.097 0.126 0.481 0.104 0.118 |

Table II below presents the target and computed pressures for the same example in the A and C sands.

TABLE II

| Pattern | A Sand | | C Sand | |
|---|---|---|---|---|
| | Target Pressure | Calculated Pressure | Target Pressure | Calculated Pressure |
| 2V-10 | 3311 | 3323 | 3210 | 3197 |
| 2V-11 | 3228 | 3228 | 3235 | 3222 |
| 2V-12 | 3223 | 3210 | 3107 | 3107 |
| 2V-13 | 3326 | 3326 | 3203 | 3203 |
| 2V-14 | 3272 | 3297 | 3183 | 3183 |
| 2V-15 | 3207 | 3219 | 3133 | 3120 |
| 2V-16 | 3300 | 3312 | 3201 | 3188 |
| 2V-17 | 3314 | 3314 | 3189 | 3189 |
| 2V-18 | 3244 | 3219 | 3104 | 3116 |

It took about 2000 generations or 42 minutes on a 150 MHz Pentium Pro to solve for the 90 unknown allocation factors in this table. The standard deviation of the error difference between the true and estimated allocation factors for this run is 0.004. Comparable results were observed on numerous different synthetics that have been run.

FIG. 9 illustrates the fitness function error (y-axis) plotted as a function of generation (x-axis) for the best string, i.e., "chromosome," as represented by curve 902, and the average of all strings, i.e., chromosomes of the entire population as represented by curve 904. The error of the best string in the population is always equal to or less than the error from earlier generations; however, note that the average error of the population reaches a minimum at about generation 700 and then begins to increase. This is a result of the mutation rate schedule we have adopted for the optimization process. As the calculations progress, the mutation rate is increased in order expand the search region to insure that the optimum solution is found. Since most mutations result in poorer performing chromosomes the increase in average error of the entire population is to be expected (and desired). The graph thus shows that at about the 700th generation, the system 10 yields a fitness function error of about 0.2 (E=0.2) as indicted by the reference 906. This corresponds roughly to pressure (P) of about plus or minus 50 to 100 pounds in the material balance solution. At its lowest point for the best string, the error is reduced to about 0.022 (E=0.022).

It is to be understood that the optimization method of the present invention may not find the exact fluid allocations for the wells of the reservoir 26. However, this method is highly advantageous in that it can repeatably find at least a very good solution, without being subject to such problems as local extrema and the like.

The present invention thus provides many important advantages in solving the problem of determining allocation factors to be used in performing material balance determinations for a reservoir. The invention substantially reduces manpower in calculating allocation factors for production and injection, and significantly improves the accuracy of allocation factor estimates. With more accurate allocation factors, the reservoir can be more efficiently swept of hydrocarbons. Additionally, the present invention allows for the optimization of the allocation factors using non-linear fitness functions, including functions having infinite derivatives, thus avoiding being trapped at local extrema. Further, the present invention optimizes the fluid allocations in a manner that can consider a fitness function that depends upon factors and inputs of various types (in the above example, these factors include pressure, fluid saturation, actual allocation values), as well as a fitness function that may be modified under certain conditions. The present invention can also account for threshold criteria in its optimization, such as whether the specification limits are met for a particular assignment.

It has been observed that the method described hereinabove can be performed quickly by data processing equipment having modest performance by modern standards (e.g., on the order of a few seconds using a 486-based personal computer). Accordingly, the present invention may be readily and inexpensively implemented at remote locations, such as at a reservoir site.

It is understood that the present invention can take many forms and embodiments. The embodiments shown herein are intended to illustrate rather than to limit the invention, it being appreciated that variations may be made without departing from the spirit of the scope of the invention. For example, any number of different threshold criteria may be established for accuracy in the estimates of allocation factors. Alternative approaches may be used for selecting the "parent" strings to use for creating subsequent generations. Different reservoir descriptions are contemplated. Variations may be made in the organization and functions of software modules used to implement the processes performed by the system 10. The processes may be organized into any number of different modules or computer programs for operation on one or more processors or work stations. The computer of the system 10 may not be required if the same functions are implemented on a processor of a fluid flow simulator tool. The programs may be used to create connectivity indices for other parameters than those mentioned in the preferred embodiment. The techniques of the present invention may also apply to analyses other than those of the preferred embodiment. The programs may be implemented in any appropriate programming language and run in cooperation with any computer system or tool.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

Appendix—Production and Injection Data

Production and injection data for the FIG. 8 reservoir model (captured in an ASCII text file) include production and injection data for year 1983 only. For each year the five data entries are, from left to right, Produced Oil, Produced Water, Produced Gas, Injected Water and Injected Gas. This file follows:

Pattern: 2V-10 Sand: A
  Static Info: HCPV 16.00, ACRES 354,48 DEPTH 5781.04 SWI 0.1213
  Well #1→2C-04
  Well #2→2C-05
  Well #3→2V-10
  Well #4→2C-08
  Well #5→2C-09
Pattern: 2V-11 Sand: A
  Statis Info: HCPV 12.00, ACRES 354.48 DEPTH 5781.04 SWI 0.1213
  Well #1→2C-05
  Well #2→2C-06
  Well #3→2V-11
  Well #4→2C-09
  Well #5→2C-10
Pattern: 2V-12 Sand: A
  Static Info: HCPV 8.00, ACRES 354.48 DEPTH 5781.04 SWI 0.1213
  Well #1→2C-06
  Well #2→2C-07
  Well #3→2V-12
  Well #4→2C-10
  Well #5→2C-11
Pattern: 2V-13 Sand: A
  Static Info: HCPV 20.00, ACRES 354.48 DEPTH 5781.04 SWI 0.1213
  Well #1→2C-08
  Well #2→2C-09
  Well #3→2V-13
  Well #4→2C-12
  Well #5→2C-13
Pattern: 2V-14 Sand: A
  Static Info: HCPV 24.00, ACRES 354.48 DEPTH 5781.04 SWI 0.1213
  Well #1→2C-09
  Well #2→2C-10
  Well #3→2V-14
  Well #4→2C-13
  Well #5→2C-14
Pattern: 2V-15 Sand: A
  Static Info: HCPV 10.00, ACRES 354.48 DEPTH 5781.04 SWI 0.1213
  Well #1→2C-10
  Well #2→2C-11
  Well #3→2V-15
  Well #4→2C-14
  Well #5→2C-15
Pattern: 2V-16 Sand: A
  Static Info: HCPV 18.00, ACRES 354.48 DEPTH 5781.04 SWI 0.1213
  Well #1→2C-12
  Well #2→2C-13
  Well #3→2V-16
  Well #4→2C-16
  Well #5→2C-17
Pattern: 2V-17 Sand: A
  Static Info: HCPV 22.00, ACRES 354.48 DEPTH 5781.04 SWI 0.1213
  Well #1→2C-13
  Well #2→2C-14
  Well #3→2V-17
  Well #4→2C-17
  Well #5→2C-18
Pattern: 2V-18 Sand: A
  Static Info: HCPV 14.00, ACRES 354.48 DEPTH 5781.04 SWI 0.1213
  Well #1→2C-14
  Well #2→2C-15
  Well #3→2V-18
  Well #4→2C-18
  Well #5→2C-19
Pattern: 2V-10 Sand: C
  Static Info: HCPV 12.00, ACRES 354.48 DEPTH 5581.04 SWI 0.3000
  Well #1→2C-04
  Well #2→2C-05
  Well #3→2V-10
  Well #4→2C-08
  Well #5→2C-09
Pattern: 2V-11 Sand: C
  Static Info: HCPV 9.00, ACRES 354.48 DEPTH 5781.04 SWI 0.1213
  Well #1→2C-05
  Well #2→2C-06
  Well #3→2V-11
  Well #4→2C-09
  Well #5→2C-10
Pattern: 2V-12 Sand: C
  Static Info: HCPV 6.00, ACRES 354.48 DEPTH 5581.04 SWI 0.3000
  Well #1→2C-06
  Well #2→2C-07
  Well #3→2V-12
  Well #4→2C-10
  Well #5→2C-11
Pattern: 2V-13 Sand: C
  Static Info: HCPV 13.00, ACRES 354.48 DEPTH 5581.04 SWI 0.3000
  Well #1→2C-08
  Well #2→2C-09
  Well #3→2V-13
  Well #4→2C-12
  Well #5→2C-13
Pattern: 2V-14 Sand: C
  Static Info: HCPV 17.00, ACRES 354.48 DEPTH 5581.04 SWI 0.3000

Well #1→2C-09
Well #2→2C-10
Well #3→2V-14
Well #4→2C-13
Well #5→2C-14
Pattern: 2V-15 Sand: C
   Static Info: HCPV 8.00, ACRES 354.48 DEPTH 5581.04 SWI 0.3000
   Well #1→2C-10
   Well #2→2C-11
   Well #3→2V-15
   Well #4→2C-14
   Well #5→2C-15
Pattern: 2V-16 Sand: C
   Static Info: HCPV 15.00, ACRES 354.48 DEPTH 5581.04 SWI 0.3000
   Well #1→2C-12
   Well #2→2C-13
   Well #3→2V-16
   Well #4→2C-16
   Well #5→2C-17
Pattern: 2V-17 Sand: C
   Static Info: HCPV 19.00, ACRES 354.48 DEPTH 5581.04 SWI 0.3000
   Well #1→2C-13
   Well #2→2C-14
   Well #3→2V-17
   Well #4→2C-17
   Well #5→2C-18
Pattern: 2V-18 Sand: C
   Static Info: HCPV 12.00, ACRES 354.48 DEPTH 5581.04 SWI 0.3000
   Well #1→2C-14
   Well #2→2C-15
   Well #3→2V-18
   Well #4→2C-18
   Well #5→2C-19
Processing well: 2C-04
   Patterns in Well . . .
   1 2V-10A
   2 2X-16A
   3 2X-01A
   4 2X-02A
   5 2V-10C
   6 2X-16C
   7 2X-01C
   8 2X-02C

| Date | Oil | Water | Gas | Inj. Water | Inj. Gas |
|---|---|---|---|---|---|
| 1983 | 0.00 | 0.00 | 0.00 | 100000.00 | 50000.00 |

Processing well: 2C-05
   Patterns in Well . . .
   1 2V-10A
   2 2V-11A
   3 2X-02A
   4 2X-03A
   5 2V-10C
   6 2V-11C
   7 2X-02C
   8 2X-03C

| Date | Oil | Water | Gas | Inj. Water | Inj. Gas |
|---|---|---|---|---|---|
| 1983 | 0.00 | 0.00 | 0.00 | 150000.00 | 75000.00 |

Processing well: 2C-06
   Patterns in Well . . .
   1 2V-11A
   2 2V-12A
   3 2X-03A
   4 2X-04A
   5 2V-11C
   6 2V-12C
   7 2X-03C
   8 2X-04C

| Date | Oil | Water | Gas | Inj. Water | Inj. Gas |
|---|---|---|---|---|---|
| 1983 | 0.00 | 0.00 | 0.00 | 200000.00 | 80000.00 |

Processing well: 2C-07
   Patterns in Well . . .
   1 2V-12A
   2 2X-04A
   3 2X-05A
   4 2X-06A
   5 2V-12C
   6 2X-04C
   7 2X-05C
   8 2X-06C

| Date | Oil | Water | Gas | Inj. Water | Inj. Gas |
|---|---|---|---|---|---|
| 1983 | 0.00 | 0.00 | 0.00 | 75000.00 | 30500.00 |

Processing well: 2C-08
   Patterns in Well . . .
   1 2V-10A
   2 2V-13A
   3 2X-15A
   4 2X-16A
   5 2V-10C
   6 2V-13C
   7 2X-15C
   8 2X-16C

| Date | Oil | Water | Gas | Inj. Water | Inj. Gas |
|---|---|---|---|---|---|
| 1983 | 0.00 | 0.00 | 0.00 | 125000.00 | 62500.00 |

Processing well: 2C-09
Patterns in Well . . .

1 2V-10A
2 2V-11A
3 2V-13A
4 2V-14A
5 2V-10C
6 2V-11C
7 2V-13C
8 2V-14C

| Date | Oil | Water | Gas | Inj. Water | Inj. Gas |
|---|---|---|---|---|---|
| 1983 | 0.00 | 0.00 | 0.00 | 75000.00 | 37500.00 |

Processing well: 2C-10
Patterns in Well . . .

1 2V-11A
2 2V-12A
3 2V-14A
4 2V-15A
5 2V-11C
6 2V-12C
7 2V-14C
8 2V-15C

| Date | Oil | Water | Gas | Inj. Water | Inj. Gas |
|---|---|---|---|---|---|
| 1983 | 0.00 | 0.00 | 0.00 | 150000.00 | 75000.00 |

Processing well: 2C-11
Patterns in Well . . .

1 2V-12A
2 2V-15A
3 2X-06A
4 2X-07A
5 2V-12C
6 2V-15C
7 2X-06C
8 2X-07C

| Date | Oil | Water | Gas | Inj. Water | Inj. Gas |
|---|---|---|---|---|---|
| 1983 | 0.00 | 0.00 | 0.00 | 100000.00 | 50000.00 |

Processing well: 2C-12
Patterns in Well . . .

1 2V-13A
2 2V-16A
3 2X-14A
4 2X-15A
5 2V-13C
6 2V-16C
7 2X-14C
8 2X-15C

| Date | Oil | Water | Gas | Inj. Water | Inj. Gas |
|---|---|---|---|---|---|
| 1983 | 0.00 | 0.00 | 0.00 | 150000.00 | 75000.00 |

Processing well: 2C-13
Patterns in Well . . .

1 2V-13A
2 2V-14A
3 2V-16A
4 2V-17A
5 2V-13C
6 2V-14C
7 2V-16C
8 2V-17C

| Date | Oil | Water | Gas | Inj. Water | Inj. Gas |
|---|---|---|---|---|---|
| 1983 | 0.00 | 0.00 | 0.00 | 50000.00 | 25000.00 |

Processing well: 2C-14
Patterns in Well . . .

1 2V-14A
2 2V-15A
3 2V-17A
4 2V-18A
5 2V-14C
6 2V-15C
7 2V-17C
8 2V-18C

| Date | Oil | Water | Gas | Inj. Water | Inj. Gas |
|---|---|---|---|---|---|
| 1983 | 0.00 | 0.00 | 0.00 | 200000.00 | 100000.00 |

Processing well: 2C-15
Patterns in Well . . .

1 2V-15A
2 2V-18A
3 2X-07A
4 2X-08A
5 2V-15C
6 2V-18C
7 2X-07C
8 2X-08C

| Date | Oil | Water | Gas | Inj. Water | Inj. Gas |
|---|---|---|---|---|---|
| 1983 | 0.00 | 0.00 | 0.00 | 150000.00 | 75000.00 |

Processing well: 2C-16
Patterns in Well . . .

1 2V-16A
2 2X-12A 3 2X-13A
4 2X-14A
5 2V-16C
6 2X-12C
7 2X-13C
8 2X-14C

| Date | Oil | Water | Gas | Inj. Water | Inj. Gas |
|---|---|---|---|---|---|
| 1983 | 0.00 | 0.00 | 0.00 | 150000.00 | 75000.00 |

Processing well: 2C-17

Patterns in Well . . .

1 2V-16A
2 2V-17A
3 2X-11A
4 2X-12A
5 2V-16C
6 2V-17C
7 2X-11C
8 2X-12C

| Date | Oil | Water | Gas | Inj. Water | Inj. Gas |
|---|---|---|---|---|---|
| 1983 | 0.00 | 0.00 | 0.00 | 100000.00 | 50000.00 |

Processing well: 2C-18

Patterns in Well . . .

1 2V-17A
2 2V-18A
3 2X-10A
4 2X-11A
5 2V-17C
6 2V-18C
7 2X-10C
8 2X-11C

| Date | Oil | Water | Gas | Inj. Water | Inj. Gas |
|---|---|---|---|---|---|
| 1983 | 0.00 | 0.00 | 0.00 | 100000.00 | 50000.00 |

Processing well: 2C-19

Patterns in Well . . .

1 2V-18A
2 2X-09A
3 2X-10A
4 2X-11A
5 2V-18C
6 2X-09C
7 2X-10C
8 2X-11C

| Date | Oil | Water | Gas | Inj. Water | Inj. Gas |
|---|---|---|---|---|---|
| 1983 | 0.00 | 0.00 | 0.00 | 125000.00 | 62500.00 |

Processing well: 2V-10
Patterns in Well . . .
1 2V-10A
2 2V-10C

| Date | Oil | Water | Gas | Inj. Water | Inj. Gas |
|---|---|---|---|---|---|
| 1983 | 112000.00 | 56000.00 | 0.00 | 0.00 | 0.00 |

Processing well: 2V-110
Patterns in Well . . .
1 2V-110A
2 2V-110C

| Date | Oil | Water | Gas | Inj. Water | Inj. Gas |
|---|---|---|---|---|---|
| 1983 | 130050.00 | 65000.00 | 0.00 | 0.00 | 0.00 |

Processing well: 2V-12
Patterns in Well . . .
1 2V-12A
2 2V-12C

| Date | Oil | Water | Gas | Inj. Water | Inj. Gas |
|---|---|---|---|---|---|
| 1983 | 87000.00 | 43500.00 | 0.00 | 0.00 | 0.00 |

Processing well: 2V-13
Patterns in Well . . .
1 2V-13A
2 2V-13C

| Date | Oil | Water | Gas | Inj. Water | Inj. Gas |
|---|---|---|---|---|---|
| 1983 | 110000.00 | 55000.00 | 0.00 | 0.00 | 0.00 |

Processing well: 2V-14
Patterns in Well . . .
1 2V-14A
2 2V-14C

| Date | Oil | Water | Gas | Inj. Water | Inj. Gas |
|---|---|---|---|---|---|
| 1983 | 173250.00 | 86500.00 | 0.00 | 0.00 | 0.00 |

Processing well: 2V-15
  Patterns in Well . . .
    1 2V-15A
    2 2V-15C

| Date | Oil | Water | Gas | Inj. Water | Inj. Gas |
|---|---|---|---|---|---|
| 1983 | 112500.00 | 56000.00 | 0.00 | 0.00 | 0.00 |

Processing well: 2V-16
  Patterns in Well . . .
    1 2V-16A
    2 2V-16C

| Date | Oil | Water | Gas | Inj. Water | Inj. Gas |
|---|---|---|---|---|---|
| 1983 | 125000.00 | 62500.00 | 0.00 | 0.00 | 0.00 |

Processing well: 2V-17
  Patterns in Well . . .
    1 2V-17A
    2 2V-17C

| Date | Oil | Water | Gas | Inj. Water | Inj. Gas |
|---|---|---|---|---|---|
| 1983 | 148000.00 | 74000.00 | 0.00 | 0.00 | 0.00 |

Processing well: 2V-18
  Patterns in Well . . .
    1 2V-18A
    2 2V-18C

| Date | Oil | Water | Gas | Inj. Water | Inj. Gas |
|---|---|---|---|---|---|
| 1983 | 146450.00 | 73200.00 | 0.00 | 0.00 | 0.00 |

(END APPENDIX)

What is claimed is:

1. A method of producing a material balance solution for well patterns in a hydrocarbon reservoir that automatically optimizes the fluid allocation factors for each well used in determining the solution, comprising the steps of:
  randomly generating a first generation of allocation factor strings, each string in the generation assigning allocation factors to each of the wells in the reservoir representing the fraction of fluid injected into or produced from a well into or out of a well pattern;
  determining a fitness function value for each of the strings by evaluating a fitness function, wherein the fitness function comprises the sum of the differences between computed and measured field pressures for each pattern, and the sum of the differences between target allocation factors and the allocation factors specified within the string for each well;
  producing a succeeding generation of allocation factor strings according to a variant of a genetic algorithm;
  repeating the step of determining a fitness function value for each of the strings in the succeeding generation; and
  identifying the string having a fitness function value meeting a specified criteria, wherein the identified string includes optimized estimates of the allocation factors for the reservoir for use in determining the material balance solution.

2. The method of claim 1 wherein the identifying step further comprises determining whether the predetermined criteria has been satisfied, whereupon the string identification occurs when the criteria has been satisfied;
  and further comprising:
    responsive to determining that the predetermined criteria is not satisfied, repeating the steps of producing a succeeding generation of strings; and determining a fitness function value for each of the strings in the succeeding generation.

3. The method of claim 1 wherein the step of producing a succeeding generation of allocation factor strings comprises:
  creating a probability value for each of the allocation factor strings in first generation by determining the fractional contribution of each string in the generation to the sum of the fitness function values for the strings in the generation;
  selecting parent sequences from the first generation according to the probability values;
  randomly selecting pairs of parent strings; and
  crossing over the selected pairs of parent strings relative to one another at a randomly selected value position to produce the succeeding generation.

4. The method of claim 1 wherein determining the fitness function further comprises:
  assigning a first weighting factor to the sum of the pressures for each pattern; and
  assigning a second weighting factor to the sum of the allocations for each well.

5. The method of claim 1 wherein the step of generating the first generation of allocation factor strings further comprises, for each string, performing a normalization procedure on the factors in the string wherein conservation of mass pertaining to the injection and production of fluids is achieved in each well.

6. The method of claim 1 further comprising the step of performing material balance calculations using the allocation factors and reservoir data to produce the computed pressure values for use in evaluating the fitness function.

7. The method of claim 6 wherein the reservoir data used in performing the material balance calculations includes one or more of production and injection history data, initial pressure data, initial hydrocarbon pore volume data, initial fluid saturation data, and fluid properties data.

8. The method of claim 1 wherein the specified criteria is one that produces pressures in a range of accuracy acceptable to field engineers.

9. The method of claim 1 wherein the first generation of strings comprises a number of strings which is more than half the number of allocation values in each string and less than twice the number of allocation values in each string.

10. The method of claim 1 wherein a well pattern represents a volume of the reservoir centered about a production well with fluid contributions from injection wells at the pattern boundaries.

11. The method of claim 1 wherein the variant of the genetic algorithm is a Bit Climber.

12. A method of producing a material balance solution for well patterns in a hydrocarbon reservoir that automatically optimizes the fluid allocation factors for each well used in determining the solution, the allocation factors representing the fraction of fluid injected to or produced from a well into or out of a well pattern, comprising the steps of:

constructing a first generation of allocation factor strings, where each string represents a random estimate of the allocation factors for each well in the reservoir;

for each string, performing material balance calculations using the allocation factors and reservoir data to produce pressure values for each well pattern;

for each string, determining a fitness function value using a fitness function that has as inputs the produced pressure values for each well pattern and the allocation factors for each well;

determining if the fitness function value for any of the strings meet a predetermined criteria indicative of accuracy of the estimated allocation factors;

if the criteria is not met, then producing a succeeding generation of allocation factor strings according to a variant of a genetic procedure and repeating the determining of the fitness function value for each of the strings in the succeeding generation until the criteria is satisfied;

such that when the criteria is satisfied, the satisfying string represents a nearly optimal estimate of allocation factors for the reservoir and a material balance solution is produced using the estimate of allocation factors.

13. The method of claim 12 wherein the reservoir data used in performing the material balance calculations includes one or more of production and injection history data, initial pressure data, initial hydrocarbon pore volume data, initial fluid saturation data and fluid properties data.

14. The method of claim 12 wherein the predetermined criteria is one that produces pressures in a range of accuracy acceptable to field engineers.

15. The method of claim 12 wherein the fitness function comprises the summation of differences between computed and measured field pressures for each pattern, and the summation of the differences between a target allocation and the allocation specified within the string for each well.

16. The method of claim 12 wherein the variant of the genetic procedure is a Bit Climber.

17. A method of optimizing estimates of fluid allocation factors for well patterns in a hydrocarbon reservoir, the allocation factor for each well representing the fraction of fluid injected to or produced from a well into or out of a well pattern, and each well pattern representing a defined volume of the reservoir centered about a production well with fluid contributions from injection wells at the pattern boundaries, comprising the steps of:

constructing a first generation of allocation factor strings, where each string represents the allocation factors for each well in the reservoir;

for each string, performing a normalization procedure on the allocation factors in the string such that conservation of mass pertaining to the production and injection of fluids is achieved with respect to each well;

for each string, performing material balance calculations using the normalized allocation factors and reservoir data to produce pressure values for each well pattern;

determining a fitness function value for each of the strings by evaluating a fitness function;

determining if any of the fitness function values for any of the strings meet a predetermined criteria;

if the criteria is not met, then producing a succeeding generation of allocation factor strings according to a variant of a genetic algorithm and repeating the process of determining the fitness function values for each of the strings in the succeeding generation until the predetermined criteria is satisfied;

such that when the criteria is satisfied, the satisfying string represents the optimal set of allocation factors for the reservoir.

18. The method of claim 17 wherein the fitness function comprises the summation of differences between computed and measured field pressures for each pattern, and the summation of the differences between a target allocation and the allocation specified within the string for each well.

19. The method of claim 17 wherein the variant of the genetic algorithm is a Bit Climber.

20. A computer program for producing a material balance solution for well patterns in a hydrocarbon reservoir that automatically optimizes the fluid allocation factors for each well used in determining the solution, the program stored on computer readable media, comprising:

instructions for randomly generating a first generation of allocation factor strings, each string in the generation assigning allocation factors to each of the wells in the reservoir representing the fraction of fluid injected into or produced from a well into or out of a well pattern;

instructions for determining a fitness function value for each of the strings by evaluating a fitness function, wherein the fitness function comprises the sum of the differences between computed and measured field pressures for each pattern, and the sum of the differences between target allocation factors and the allocation factors specified within the string for each well;

instructions for producing a succeeding generation of allocation factor strings according to a variant of a genetic algorithm;

instructions for repeating the step of determining a fitness function value for each of the strings in the succeeding generation; and instructions for identifying the string having a fitness function value meeting a specified criteria, wherein the identified string includes optimized estimates of the allocation factors for the reservoir for use in determining the material balance solution.

21. The program of claim 20 wherein the identifying instructions further comprise determining whether the predetermined criteria has been satisfied, whereupon the string identification occurs when the criteria has been satisfied;

and further comprising:

instructions responsive to determining that the predetermined criteria is not satisfied, repeating the instructions of producing a succeeding generation of strings; and determining a fitness function value for each of the strings in the succeeding generation.

22. The program of claim 20 wherein the instruction for producing a succeeding generation of allocation factor strings comprises:

instructions for creating a probability value for each of the allocation factor strings in first generation by determining the fractional contribution of each string in the generation to the sum of the fitness function values for the strings in the generation;

instructions for selecting parent sequences from the first generation according to the probability values;

instructions for randomly selecting pairs of parent strings; and instructions for crossing over the selected pairs of parent strings relative to one another at selected value position to produce the succeeding generation.

23. The method of claim 20 wherein the variant of the genetic algorithm is a Bit Climber.

24. A system for producing a material balance solution for well patterns in a hydrocarbon reservoir that automatically optimizes the fluid allocation factors for each well used in determining the solution, comprising:

means for randomly generating a first generation of allocation factor strings, each string in the generation assigning allocation factors to each of the wells in the reservoir representing the fraction of fluid injected into or produced from a well into or out of a well pattern;

means for determining a fitness function value for each of the strings by evaluating a fitness function, wherein the fitness function comprises the sum of the differences between computed and measured field pressures for each pattern, and the sum of the differences between target allocation factors and the allocation factors specified within the string for each well;

means for producing a succeeding generation of allocation factor strings according to a variant of a genetic algorithm;

means for repeating the step of determining a fitness function value for each of the strings in the succeeding generation; and means for identifying the string having fitness function value meeting a specified criteria, wherein the identified string includes optimized estimates of the allocation factors for the reservoir for use in determining the material balance solution.

25. The method of claim 24 wherein the means for generating a first generation of allocation factor strings further comprises means for performing, for each string, a normalization procedure on the factors in the string wherein conservation of mass pertaining the injection and production of fluids is achieved in each well.

26. The method of claim 24 wherein the means for producing a succeeding generation of allocation factor strings according to a variant of a genetic algorithm further comprises means for producing a succeeding generation of allocation factor strings according to a Bit Climber.

* * * * *